(12) United States Patent
Chung

(10) Patent No.: US 7,365,969 B2
(45) Date of Patent: Apr. 29, 2008

(54) COMPUTER CASE

(75) Inventor: Cheng-Kuang Chung, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 426 days.

(21) Appl. No.: 11/023,022

(22) Filed: Dec. 23, 2004

(65) Prior Publication Data
US 2005/0183100 A1    Aug. 18, 2005

(30) Foreign Application Priority Data
Feb. 13, 2004    (TW) ............................... 93202066 U

(51) Int. Cl.
  *G06F 1/16*     (2006.01)
  *H05K 5/00*    (2006.01)
(52) U.S. Cl. ...................... 361/683; 361/679
(58) Field of Classification Search ............... 361/683, 361/679
  See application file for complete search history.

(56) References Cited

U.S. PATENT DOCUMENTS

| | | | | |
|---|---|---|---|---|
| 5,495,389 A | * | 2/1996 | Dewitt et al. ............... | 361/683 |
| 5,784,252 A | * | 7/1998 | Villa et al. ................... | 361/683 |
| 5,999,416 A | * | 12/1999 | McAnally et al. .......... | 361/683 |
| 6,392,875 B1 | * | 5/2002 | Erickson et al. ............ | 361/683 |
| 6,404,625 B1 | * | 6/2002 | Chen et al. ................. | 361/683 |
| 6,570,755 B2 | * | 5/2003 | Curlee et al. ............... | 361/683 |
| 6,654,236 B2 | * | 11/2003 | Chen et al. ................. | 361/683 |
| 7,184,261 B2 | * | 2/2007 | Chung ........................ | 361/683 |

FOREIGN PATENT DOCUMENTS

CN     93220537.2     5/1994

* cited by examiner

Primary Examiner—Lisa Lea-Edmonds
(74) Attorney, Agent, or Firm—Morris Manning Martin LLP; Tim Tingkang Xia, Esq.

(57) ABSTRACT

A computer case includes a chassis (10), a cover (80) with a tray (70) pivotally attached to the chassis, and a shaft (20). The chassis comprises a bottom panel (11) with a mounting board mounted thereto. A pair of mounting plates (33) is stamped from the mounting board to secure the shaft. A number of support plates (31) are stamped from the mounting board to support the shaft. A number of support plates (71) are stamped from the tray to be supported on the shaft. The shaft thus shares the burden of the tray when the tray is rotated.

15 Claims, 5 Drawing Sheets

COMPUTER CASE

BACKGROUND OF THE INVENTION

1. Field of the Invention

The present invention relates to a computer case, and more particularly to a computer case with a pivot cover.

2. Description of Related Art

New computer components and accessories are continually being developed. This necessitates regular maintenance, renewal and upgrading of components and fittings of existing computers. Accordingly, a computer case should allow readily accession.

A conventional computer case comprises a chassis and a hood. Interior components, such as motherboard, power supply, interface cards, data storage devices, etc., are often installed in the chassis. However, the interior space of the chassis is limited. When one of the components needs maintenance or replacement, neighboring components have the risks of being damaged.

An improved computer case is disclosed in Chinese Patent Application No. 93220537.2. The computer case comprises a chassis, and a pivot hood. Data storage devices such as disk drives are attached to an underside of the hood. When the hood is open for maintaining or replacing the interior components, the data storage devices are separated from the chassis, so that maintenance or replacement is prone to be easier. The hook is pivoted about the chassis via a pair of pivot bolts. However, the data storage devices increase the burden of the hood, and the hook is supported only by the pivot bolts during rotation, therefore, the pivot bolts are prone to be deformed or broken.

SUMMARY OF THE INVENTION

Accordingly, an object of the present invention is to provide a computer case having a pivot cover which is strongly supported.

To achieve the above object, the chassis in accordance with the preferred embodiment of the present invention comprises a chassis, a cover with a tray pivotally attached to the chassis, and a shaft. The chassis comprises a bottom panel with a mounting board mounted thereto. A pair of mounting plates is stamped from the mounting board to secure the shaft. A plurality of support plates is stamped from the mounting board to support the shaft. A plurality of support plates is stamped from the tray to be supported on the shaft. The shaft thus shares the burden of the tray when the tray is rotated.

Other objects, advantages and novel features of the present invention will be drawn from the following detailed description of preferred embodiment of the present invention with the attached drawings, in which:

DETAILED DESCRIPTION OF THE INVENTION

Figure 1:
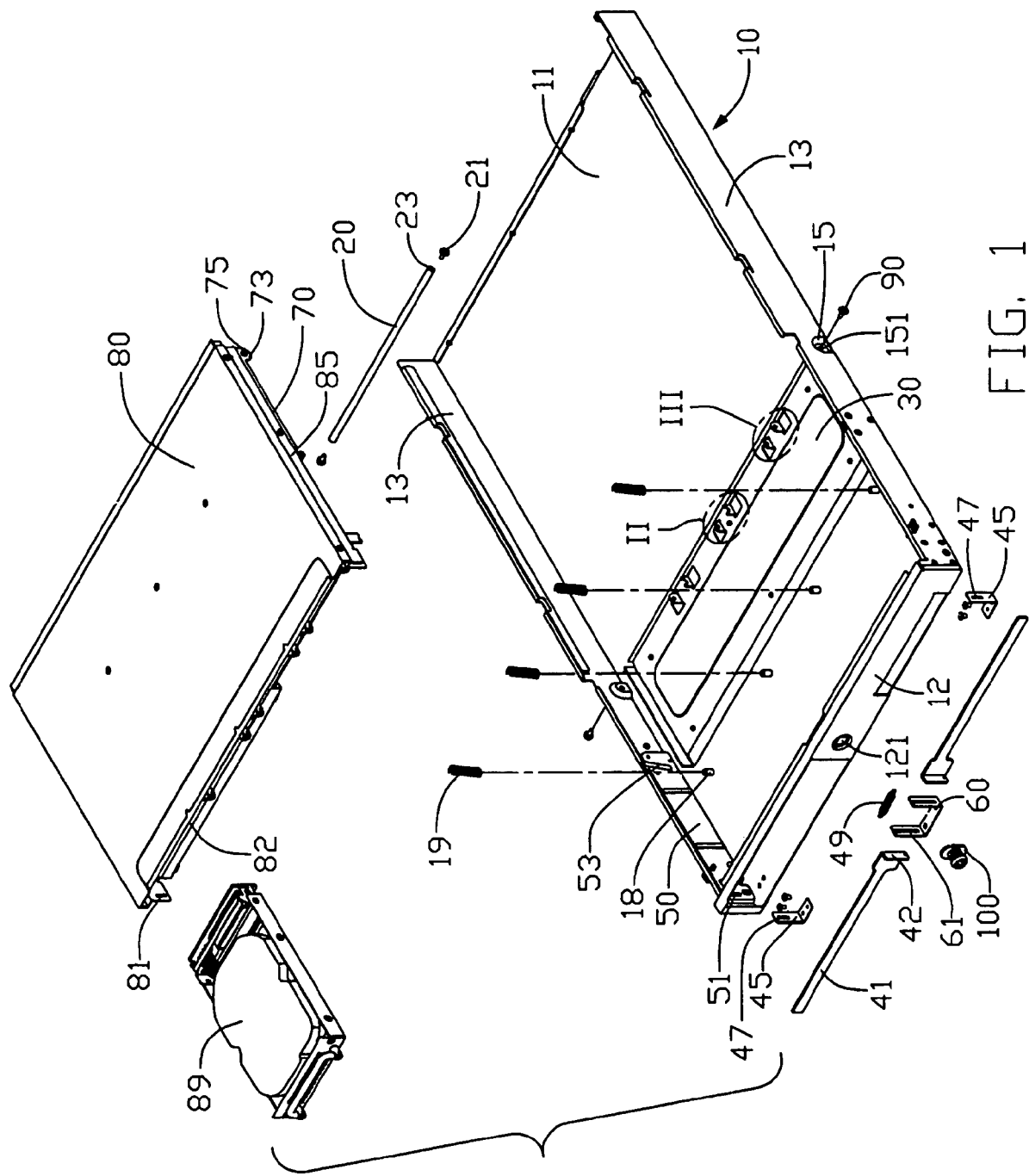
FIG. 1 is an exploded, isometric view of a computer case in accordance with a preferred embodiment of the present invention, comprising a chassis, a cover and a shaft.

Referring to FIG. 1, a case of an electronic device like a computer in accordance with the preferred embodiment of the present invention comprises a chassis 10, a cover 80, and a shaft 20.

The chassis 10 comprises a bottom panel 11, two side panels 13 respectively extending from two opposite sides of the bottom panel 11, and a front panel 12 extending from a front edge of the bottom panel 11 so as to commonly define a space between these panels. Two side plates 50 are arranged at front portions of the side panels 13, respectively. A mounting hole 51 is defined in a front portion of each side plate 50. An arc-shaped guiding slot 53 is defined in a rear portion of each side plate 50. A pair of rotation bases 15 is stamped inwardly from middle portions of the side panels 13 respectively, and in alignment with each other. A through aperture 151 is defined in each rotation base 15.

The front panel 12 defines a mounting opening 121 in a center thereof. A cam lock 100 extends through the mounting opening 121. The cam lock 100 comprises an elliptic pushing portion. A U-shaped first support member 60 is attached to the bottom panel 11. Two L-shaped second support member 45 are attached to the bottom panel 11, and adjacent to the side plates 50 respectively. The first and second support members 60, 45 are located on a same line. Upright plates of the first support member 60 each define a slim slot 61. An upright plate 47 of each second support member 45 defines a slim slot 47. The mounting holes 51 of the side plates 50 are in alignment with the slim slots 61, 47. Two locking bars 41 extend through the corresponding slim slots 61, 47, respectively. Each locking bar 41 has a bent plate 42 located at inner sides of the upright plates of the first support member 60. A spring 49 connects the bent plates 42 of the locking bars 41. A row of posts 18 extends upwardly from a front portion of the bottom panel 11. A spring 19 is placed around each post 18.

Figure 2:
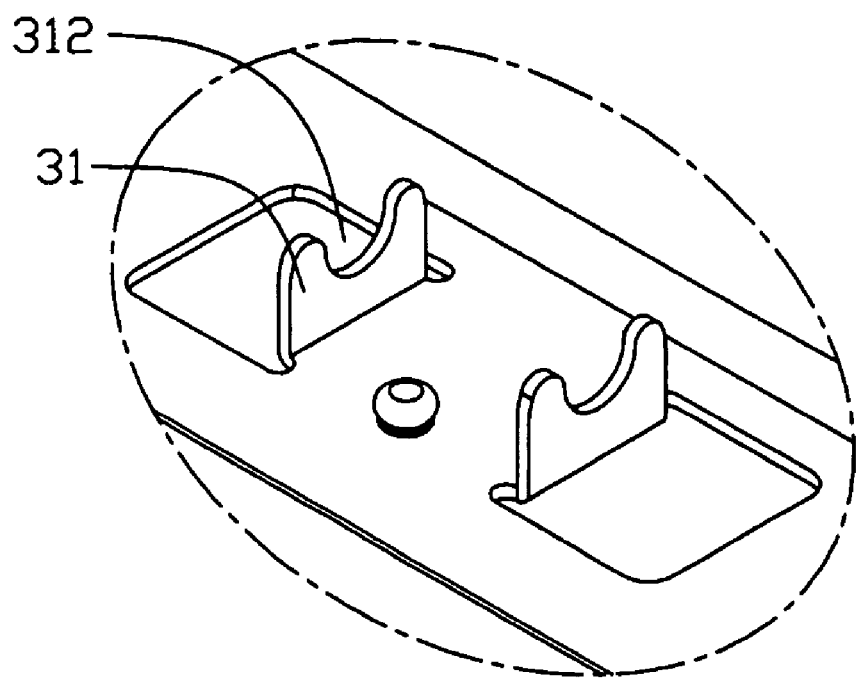
FIG. 2 is an enlarged view of an encircled portion II of FIG. 1.
Figure 3:
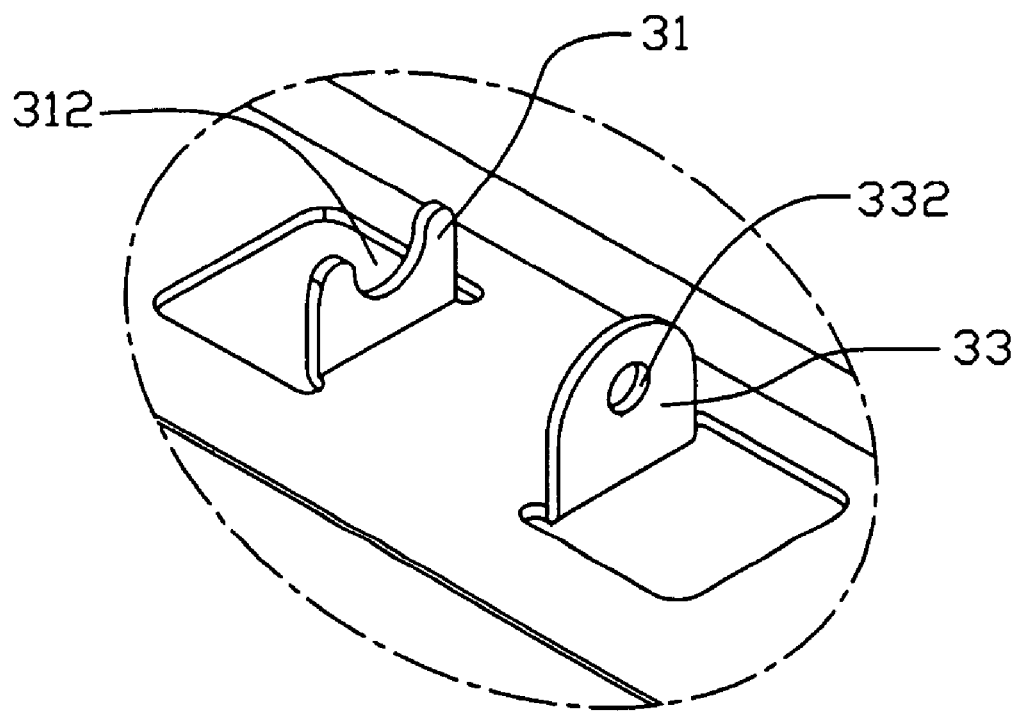
FIG. 3 is an enlarged view of an encircled portion II of FIG. 1.

A mounting board 30 is disposed on the bottom panel 11 and behind the posts 18. Referring also to FIGS. 2 and 3, a row of support plates 31 is stamped upwardly from the mounting board 30, and two mounting plates 33 are stamped from the mounting board 30 at opposite sides of the row of support plates 31. A cutout 312 is defined in each support plate 31. A pivot hole 332 is defined in each mounting plate 33.

Figure 4:
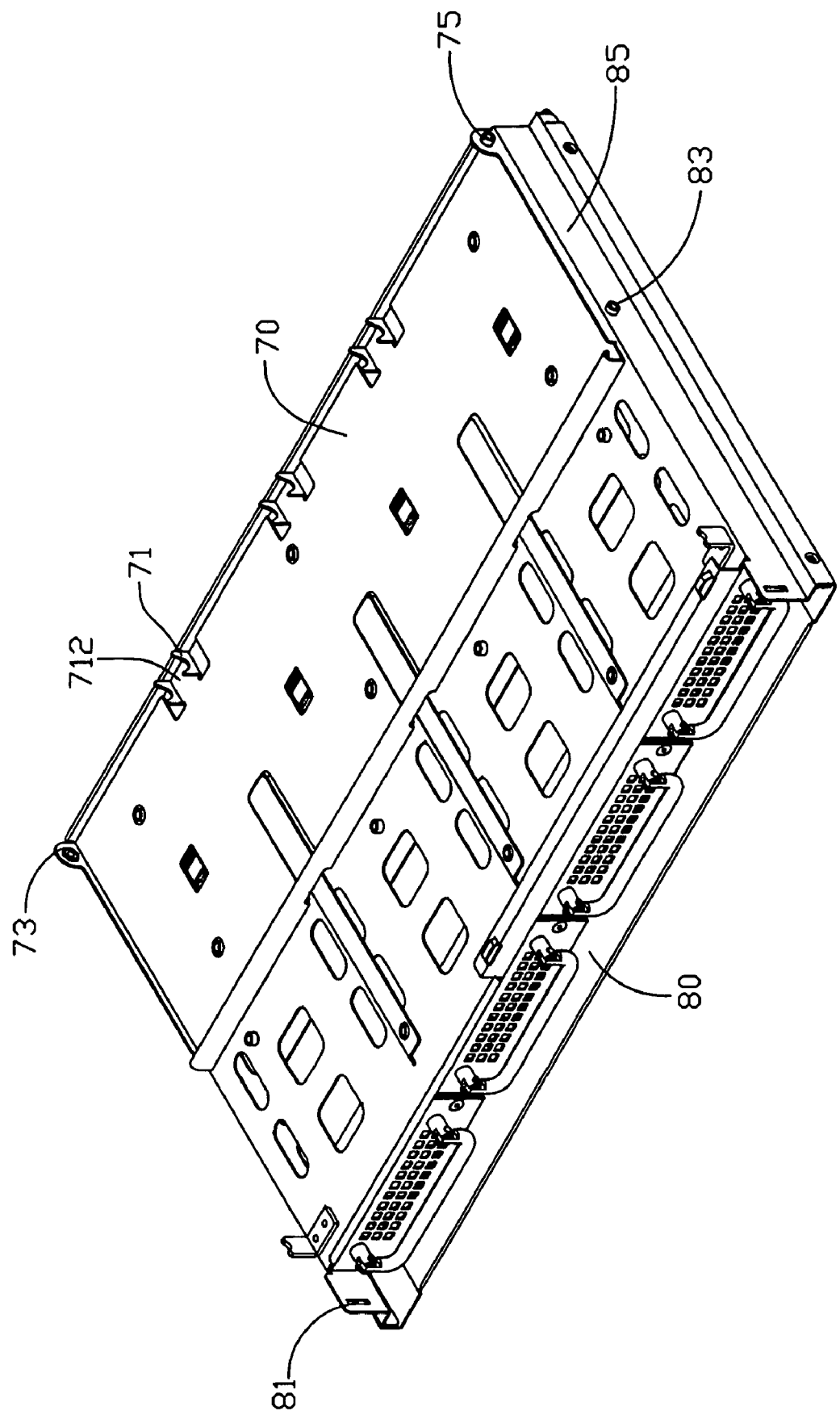
FIG. 4 is an isometric view of the cover, viewed from another aspect.

Referring also to FIG. 4, the cover 80 comprises two sidewalls 85. A front portion of each sidewall 85 defines a slit 81 corresponding to the mounting hole 51 of a corresponding side plate 50. A protrusion 83 is stamped outwardly from each sidewall 85 corresponding to the guiding slot 53 of the side plate 50 of the chassis 10. A plurality of receiving chambers 82 as a receiving space is defined in the cover 80 for accommodating devices like disk drives 89 or other electronic components.

A support tray 70 is attached to an underside of the cover 80. The support tray 70 forms a row of support plates 71, each of which defines a cutout 712. A pivot plate 73 is formed at each of opposite sides of the support tray 70. A pivot 75 with a threaded aperture (not labeled) is stamped outwardly from each pivot plate 73.

The shaft 20 defines two threaded holes in opposite ends 23 thereof. The shaft 20 extends through the pivot holes 332 of the mounting plates 33, and is seated in the cutouts 312 of the support plates 31. Two fasteners 21 such as screws engage in the threaded holes of the shaft 20, thereby pivotally securing the shaft 20 to mounting board 30 of the chassis 10 to form a supportive mechanism.

Figure 5:
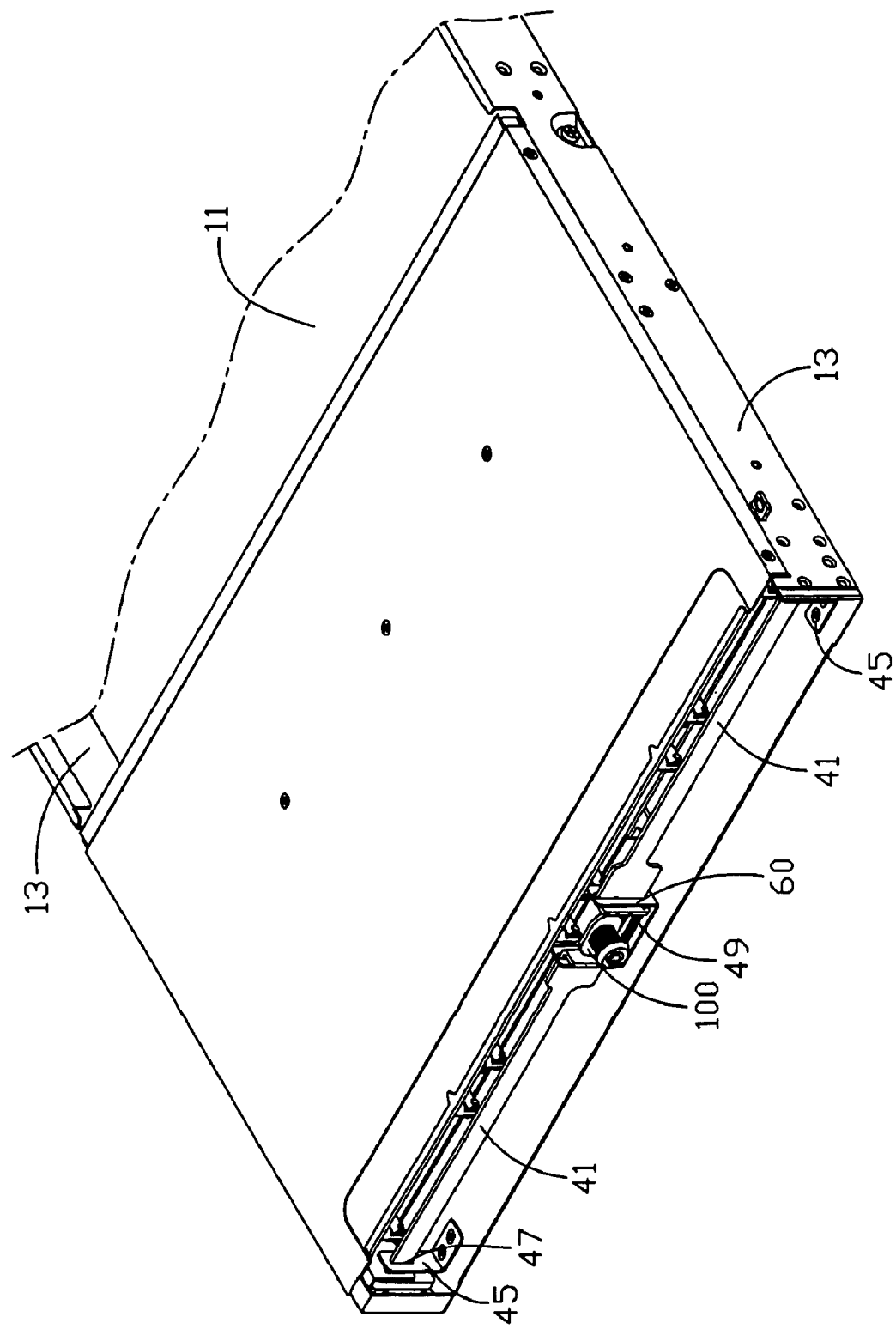
FIG. 5 is an assembled view of FIG. 1, with a front panel being partly cut off for better illustration.
Figure 6:
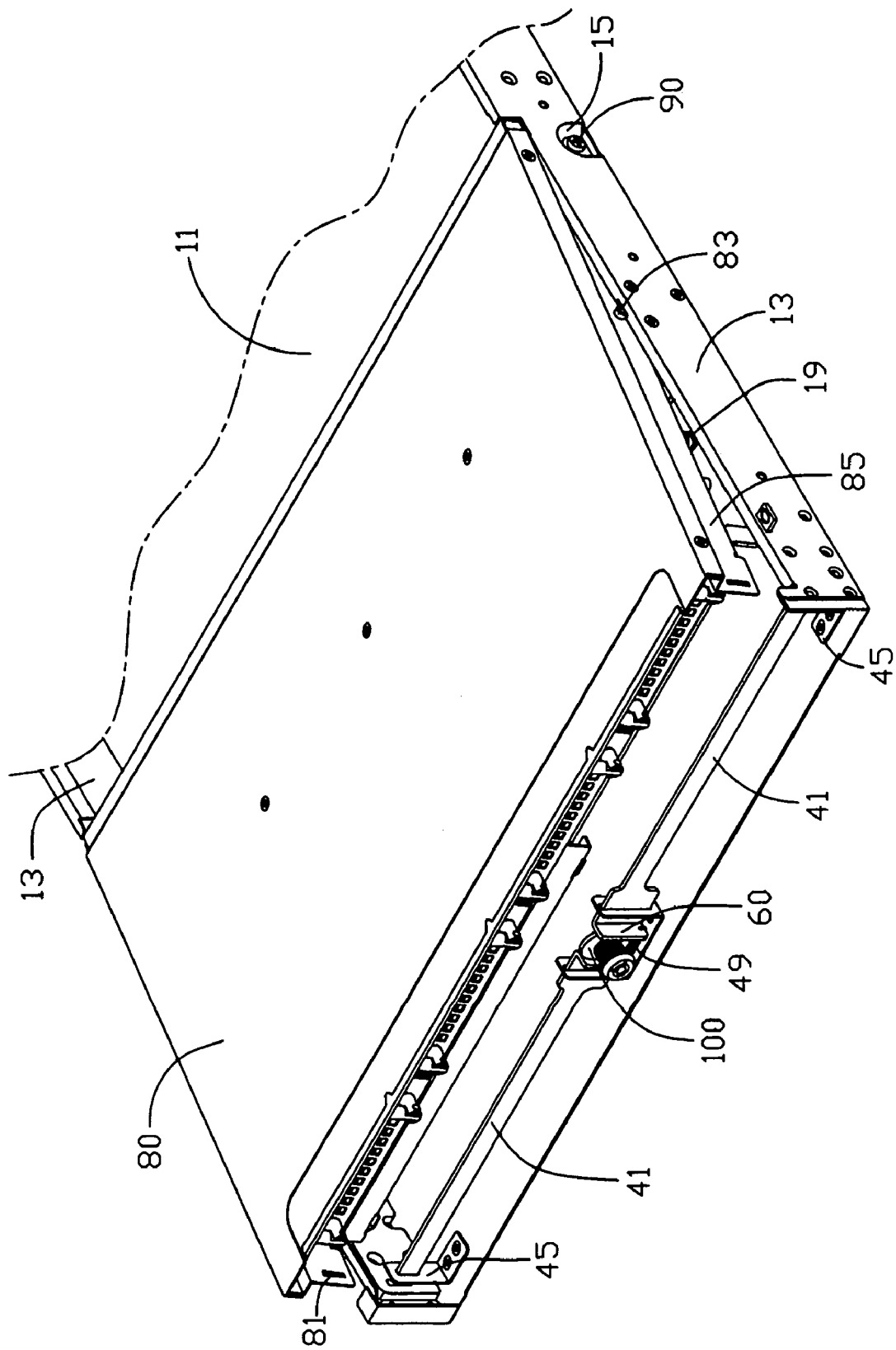
FIG. 6 is a pre-assembled view of FIG. 1, showing a rotation state of the cover, and having a front panel being partly cut off for better illustration.

Referring also to FIGS. 5 and 6, in assembly, the disk drives 89 are received in the receiving chambers 82 of the cover 80. The support tray 70 is attached to the cover 80; the support plates 71 of the support tray 70 rotatably receive the shaft 20 of the mounting board 30. The pivot plates 73 of the support tray 70 are in alignment with the rotation bases 15 of the chassis 10; the pivots 75 of the pivot plates 73 extend through corresponding through apertures 151 of the rotation bases 15, and engage with fasteners 90 such as screws. The cover 80 is thus pivotally mounted to the chassis 10, and supported by the shaft 20 of the supportive mechanism.

In closing the tray 70, the protrusions 83 of the cover 80 are slid along the guiding slots 53, until the support tray 70 is located horizontally and compresses the springs 19. Then rotate the cam lock 100 until the elliptic pushing portion pushes the locking bars 41 outwardly, so that the locking bars 41 extend through the corresponding slits 81 of the cover 80 and the mounting holes 51 of the side plates 50 of the chassis 10, thereby locking the cover 80 to the chassis 10. The spring 49 is stretched.

To open the cover 80, the cam lock 100 is rotated so that the elliptic pushing portion leaves the bent plates 42 of the locking bars 41. The locking bars 41 are moved toward each other via the restoring force of the spring 49. The locking bars 41 are withdrawn from the mounting holes 51 of the side plates 50 and the slits 81 of the cover 80, respectively. The cover 70 is rotated upwardly via the restoring force of the springs 19, and supported on the springs 19. Replacing or maintaining the disk drives 89 is therefore easier.

In another embodiment, the tray 70 and the cover 80 are integrally formed. The mounting board 30 and the bottom panel 11 are integrally formed.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

What is claimed is:

1. A computer case comprising:
a chassis, comprising a bottom panel and two side panels, two mounting plates arranged on the bottom panel, a rotation base formed at each of the side panels;
a shaft attached to the mounting plates; and
a tray comprising at least one first support plate, and two pivot plates pivotally connected to the rotation bases respectively;
wherein during the tray pivots about the rotation bases of the chassis, said first support plate of the tray is supported on the shaft.

2. The computer case as claimed in claim 1, wherein the shaft and the rotation bases are located in a same line.

3. The computer case as claimed in claim 2, wherein at least one second support plate is arranged on the bottom panel and in a same line with the mounting plates.

4. The computer case as claimed in claim 3, wherein a cutout is defined in an upper portion of said second support plate for supportingly receiving the shaft.

5. The computer case as claimed in claim 1, wherein a mounting aperture is defined in each of the mounting plates for a fastener extending therethrough to fasten an end of the shaft.

6. The computer case as claimed in claim 1, wherein a mounting board is attached on the bottom panel of the chassis, the mounting plates are stamped from the mounting board.

7. The computer case as claimed in claim 1, wherein the rotation base is stamped inwardly from the corresponding side panel, and defines a through aperture; each of the pivot plates outwardly forms a pivot with a threaded aperture; a fastener extends through the through aperture of the rotation base, and engages in the threaded aperture.

8. The computer case as claimed in claim 1, wherein an arc-shaped guiding slot is defined in each of the side panels, a protrusion extends outwardly from each of opposite sides of the tray to slide in the guiding slot.

9. The computer case as claimed in claim 1, wherein a row of posts protrudes from the bottom panel, a spring is placed around each of the posts for resiliently supporting the tray.

10. The computer case as claimed in claim 1, wherein the tray further comprises a cover attached thereonto, the cover defines a plurality of receiving chambers to receive electronic devices.

11. A computer case comprising:
a chassis comprising a bottom panel and two opposite side panels;
a tray having one end thereof pivotally attached to the side panels of the chassis; and
a first support member arranged to the tray, a second support member arranged to the bottom panel, the second support member located on a line around which the tray pivots; wherein
when the tray rotates, the first support member of the tray is supported by the second support member of the bottom panel.

12. The computer case as claimed in claim 11, wherein the first support member comprises a plurality of support plates formed from an underside of the tray, each of the support plates defines a cutout.

13. The computer case as claimed in claim 12, wherein the second support member comprises two mounting plates formed from the bottom panel, a shaft is secured to the mounting plates and is supportingly received in the cutouts of the support plates of the tray.

14. The computer case as claimed in claim 13, wherein the second support member further comprises a plurality of support plates formed from the bottom panel to support the shaft.

15. The computer case as claimed in claim 11, wherein two rotation bases are formed from the side panels of the chassis respectively, a through aperture is defined in each of the rotation bases; two pivot plates are formed from two opposite sides of the tray to pivotally attached to the rotation bases respectively.

* * * * *